(12) United States Patent
Jeoung et al.

(10) Patent No.: US 7,212,263 B2
(45) Date of Patent: May 1, 2007

(54) LIQUID CRYSTAL DISPLAY DEVICE AND FABRICATION METHOD THEREOF

(75) Inventors: Hun Jeoung, Gyeongsangbuk-do (KR); Sang Ho Kim, Choongchungnam (KR)

(73) Assignee: LG. Philips LCD Co., Ltd., Seoul (KR)

( * ) Notice: Subject to any disclaimer, the term of this patent is extended or adjusted under 35 U.S.C. 154(b) by 232 days.

(21) Appl. No.: 10/955,157

(22) Filed: Sep. 30, 2004

(65) Prior Publication Data

US 2005/0134764 A1 Jun. 23, 2005

(30) Foreign Application Priority Data

Dec. 23, 2003 (KR) .................. 10-2003-0095109

(51) Int. Cl.
*G02F 1/1333* (2006.01)
*G02F 1/1335* (2006.01)
*G02F 1/136* (2006.01)

(52) U.S. Cl. .................. 349/110; 349/106; 349/111; 349/44

(58) Field of Classification Search ........ 349/110–111, 349/106, 44

See application file for complete search history.

(56) References Cited

U.S. PATENT DOCUMENTS

| 4,853,296 | A  | * | 8/1989 | Fukuyoshi | .................. 428/623 |
| 7,006,175 | B2 | * | 2/2006 | Yeh et al. | .................... 349/106 |
| 2005/0052594 | A1 | * | 3/2005 | Lee et al. | .................... 349/110 |
| 2005/0088589 | A1 | * | 4/2005 | Edwards et al. | ............ 349/110 |

* cited by examiner

*Primary Examiner*—Mike Qi
(74) *Attorney, Agent, or Firm*—Brinks Hofer Gilson & Lione (57) ABSTRACT

A liquid crystal display device includes a liquid crystal layer interposed between opposing substrates. One of the substrates includes a conductive black matrix layer formed within a display region and formed in non-display region of the device. A black matrix island formed at the same time as the black matrix layer is isolated from the black matrix layer in the non-display region. A color filter layer of red, green and blue color filters is formed in the display region. A common electrode is formed on the black matrix layer and on the black matrix island. The common electrode formed on the black matrix island is insulated from the black matrix island by an insulator. Silver dots in the non-display region are respectively connected with the black matrix layer and the common electrode on the black matrix island.

14 Claims, 12 Drawing Sheets

LIQUID CRYSTAL DISPLAY DEVICE AND FABRICATION METHOD THEREOF

CLAIM FOR PRIORITY

This application claims the benefit of Korean Application No. 95109/2003, filed on Dec. 23, 2003, which is hereby incorporated by reference as if fully set forth herein.

BACKGROUND

1. Technical Field

The present invention relates to a liquid crystal display device (LCD), and more particularly, to an LCD that mitigates electromagnetic interference (EMI), and a fabrication method thereof.

2. Related Art

In general, display devices have used a cathode ray tube (CRT) to display image information on a screen. However, CRT displays are problematic as they take up a large volume and are extremely heavy compared with the display area.

With the rapid development of the electronics industry, the importance of the CRT display devices has decreased. Various electronic devices such as a personal computer, a notebook, a wireless terminal, a vehicle instrument panel, an electronic display board and the like now require much lighter and smaller displays than that afforded by the CRT. Also, due to the development of information communication technology, since it is possible to transmit large capacity image information, the importance on a next generation display device capable of processing and displaying the large capacity image information has increased dramatically.

Such a next generation display device ideally has a slim profile, is lightweight, has a high luminance, a large-sized screen, a low power consumption and a low price. Among such next generation display devices, the liquid crystal display (LCD) is extremely popular due to its excellent resolution, which is better than other flat displays, as well as the fact that its response rate is fast, that is, considerable to that of the CRT in implementing a moving picture.

The LCD generally displays images using light transmittance that varies when a voltage is applied to electrodes of two substrates facing each other to generate an electric field between the electrodes. This electric field aligns liquid crystal molecules disposed between the electrodes.

The LCDs can be made in a variety of structures and materials. An active matrix LCD (AM-LCD) including thin film transistors (TFTS) and pixel electrodes connected with the TFTs is currently in the limelight owing to its excellent resolution and moving picture-implementing capability.

Figure 1:
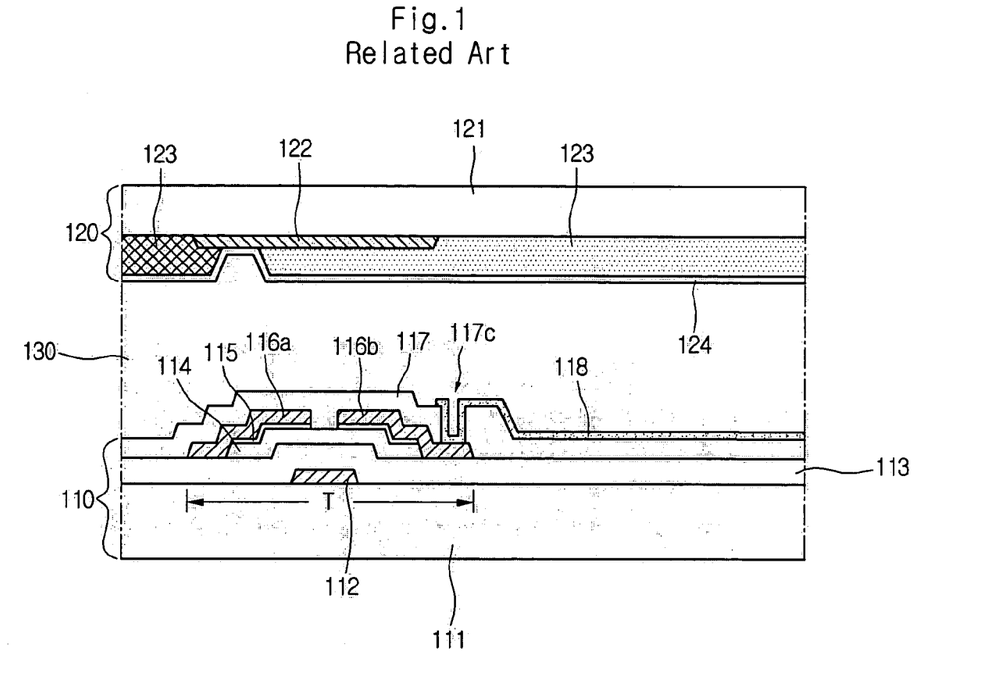
FIG. 1 is a sectional view of a general LCD.

FIG. 1 is a sectional view of a general LCD. Referring to FIG. 1, a general LCD includes an array substrate 110, a color filter substrate 120, and a liquid crystal layer 130 interposed between the two substrates 110 and 120.

The array substrate 110 includes a gate electrode 112 and a gate insulating layer 113. The gate electrode 112 is formed of conductive material such as metal on a first transparent substrate 111. The gate insulating layer 113 covers the gate electrode 112 and is formed of silicon nitride layer ($SiN_x$) or silicon oxide layer ($SiO_2$).

An active layer 114 is formed on the gate insulating layer 113, and an ohmic contact layer 115 is formed on the active layer 114. The active layer 114 is formed of undoped (i.e. unintentionally doped) amorphous silicon, and the ohmic contact layer 115 is formed of intentionally doped amorphous silicon.

Source and drain electrodes 116a and 116b are formed on the ohmic contact layer 115 and constitute a thin film transistor T together with the gate electrode 112. The source and drain electrodes 116a and 116b are formed of conductive material such as metal.

Although not shown, the gate electrode 112 is connected to a gate line, and the source electrode 116a is connected to a data line. The gate line and the data line are perpendicular to each other. The gate line and the data line define a pixel region.

A passivation layer 117 is formed on the source and drain electrodes 116a and 116b and it has a contact hole 117c exposing the drain electrode 116b. The passivation layer 117 is formed of a silicon nitride layer, a silicon oxide layer, or an organic insulating layer.

A pixel electrode 118 is formed on the pixel region and is connected to the drain electrode 116b through the contact hole 117c. The pixel electrode 118 is formed of a transparent conductive material.

The color filter substrate 120 is spaced apart from the first substrate 111 by a predetermined distance. The color filter substrate includes a second substrate 121. A black matrix layer 122 is formed in an inner side of the second substrate 121 at a position corresponding to the thin film transistor T. Although not shown, the black matrix 122 is formed on a front side of the substrate and has an opening at a position corresponding to the pixel electrode 118.

Accordingly, the black matrix layer 122 prevents light leakage, which occurs when liquid molecules are tilted in a region other than the region covered by the pixel electrode 118. Also, the black matrix layer 122 blocks light from being incident on a channel region of the thin film transistor T, thereby preventing light leakage current.

A color filter 123 is formed on the black matrix layer 122. The color filter layer 123 includes red, green and blue color filters, which are repeated in sequence. One color corresponds to one pixel electrode 118. A common electrode 124 is formed of a transparent conductive material below the color filter layer 123.

A method for manufacturing the LCD includes forming a thin film transistor and a pixel electrode on an array substrate, forming a color filter layer and a common electrode on a color filter substrate, arranging the substrates, injecting liquid crystal between the substrates, sealing the substrates, and attaching polarizers to the substrates. In such an LCD, the pixel electrode 118 is formed on the array substrate 110 and the common electrode is formed on the color filter substrate 120. Liquid crystal molecules are driven by an electric field applied in a direction perpendicular to the substrates.

Figure 2:
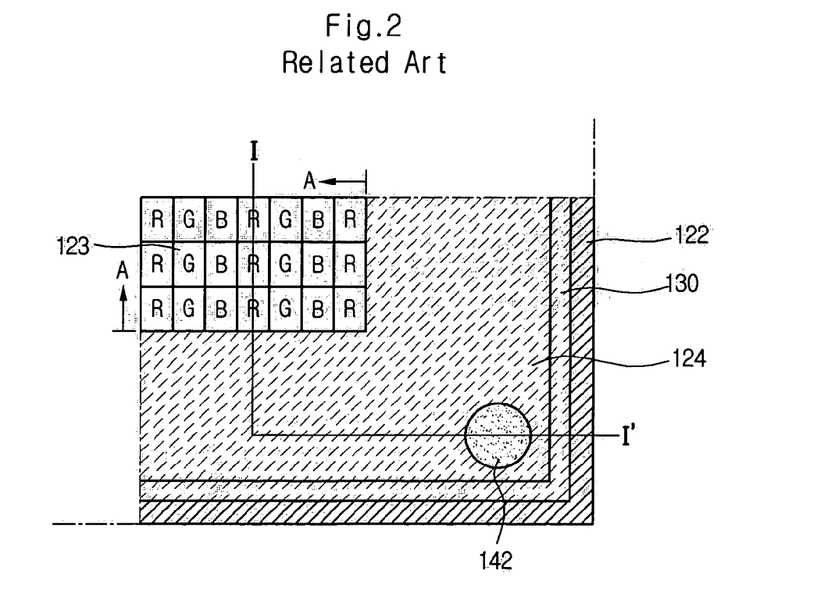
FIG. 2 is a view schematically illustrating a portion of a color filter substrate in an LCD according to the related art.

FIG. 2 is a view schematically illustrating a portion of a color filter substrate in an LCD according to the related art. Only one edge of the second substrate is shown in FIG. 2. In FIG. 2, a color filter substrate includes an active region A, which corresponds to an image display region formed on the array substrate. Electrical signals are applied to a variety of elements using a region formed at a periphery of the active region.

As shown, a black matrix layer 122 is formed on the color filter substrate. The black matrix layer 122 prevents light leakage between cells of color filter patterns and at a periphery of the active region A.

Patterns of red (R), green (G) and blue (B) color filters 123 are formed on the active region A of the black matrix layer 122. An overcoat layer 130 for insulation and planarization of the layers thereunder is coated to a predetermined thickness on the substrate on which the color filter patterns are formed. A common electrode 124 is formed on the overcoat layer 130 so as to operate liquid crystal cells together with a pixel electrode formed on a lower TFT substrate.

In order to apply signals from a pad part of a lower substrate to the common electrode 124, a common voltage (Vcom) Ag dot 142 is formed at a position that is in contact with the common electrode 124 formed on the black matrix 122.

Figure 3:
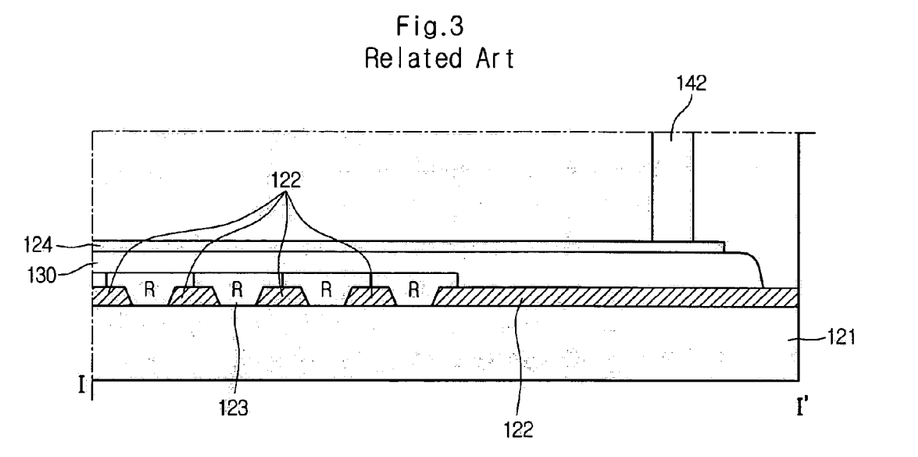
FIG. 3 is a partial sectional view of the color filter substrate, taken along line I–I' of FIG. 2.

FIG. 3 is a partial sectional view of the color filter substrate, taken along line I–I' of FIG. 2. Referring to FIG. 3, the color filter substrate includes the black matrix layer 122 formed on the transparent insulating substrate 121, the color filter layer 123 of red, green and blue color filters, the overcoat layer 130, and the common electrode 224, which are sequentially formed on the black matrix layer 122. As shown, the Vcom Ag dot 142 is formed at a position that is in contact with the common electrode 124 formed on the black matrix 122.

A conventional LCD with such an arrangement has a good transmittance and aperture ratio. The common electrode 124 acts as ground and prevents breakdown in the liquid crystal cells due to a charge buildup between the substrates. In the conventional LCD, however, a very fast electric change occurs when an image display signal is applied, so that a large amount of electromagnetic interference (EMI) occurs.

Although electromagnetic radiation is useful in wireless communication or radar applications, unintended electromagnetic radiation occurring inside a variety of electronic devices containing the LCD may influence the operation of the electronic devices containing the LCD as well as the operation of other electronic devices present. As a result, operation of the electronic devices may be interrupted or the electronic devices may otherwise malfunction. Further, if the electromagnetic components are radiated or transported through connections between the LCD and other parts of the electronic device, the picture or tone quality of the LCD may be degraded.

SUMMARY

By way of introduction only, in one embodiment, a liquid crystal display device is provided that comprises: first and second substrates spaced apart by a predetermined distance from each other; and a liquid crystal layer interposed between the first substrate and the second substrate, wherein the second substrate comprises: a black matrix layer formed on a predetermined portion within an active region on the second substrate and a periphery of the active region; a black matrix island arranged spaced apart by a predetermined distance from the black matrix layer; a color filter layer of red, green and blue color filters formed on the active region; an overcoat layer formed on the black matrix layer and the overcoat layer; a common electrode formed on the black matrix island; and a first Ag (silver) dot connected with the black matrix layer and a second Ag dot connected with the common electrode on the black matrix island.

In another aspect of the present invention, a liquid crystal display device comprises: first and second substrates spaced apart by a predetermined distance from each other; and a liquid crystal layer interposed between the first substrate and the second substrate, wherein the second substrate comprises: a black matrix layer formed on a predetermined portion within an active region on the second substrate and a periphery of the active region; a black matrix island formed on a non-active region and spaced apart from the black matrix layer; a color filter layer of red, green and blue color filters formed on the black matrix layer and the black matrix island; a common electrode formed on the color filter layer; and a first Ag (silver) dot connected with the black matrix layer and a second Ag dot connected with the common electrode on the black matrix island.

It is to be understood that both the foregoing general description and the following detailed description of the present invention are exemplary and explanatory and are intended to provide further explanation of the invention as claimed.

BRIEF DESCRIPTION OF THE DRAWINGS

The inventions can be better understood with reference to the following drawings and description. The components in the figures are not necessarily to scale, emphasis instead being placed upon illustrating the principles of the inventions. Moreover, in the figures, like referenced numerals designate corresponding parts throughout the different views.

DETAILED DESCRIPTION

The present invention will now be described more fully with reference to the accompanying drawings, in which exemplary embodiments of the invention are shown.

Figure 4:
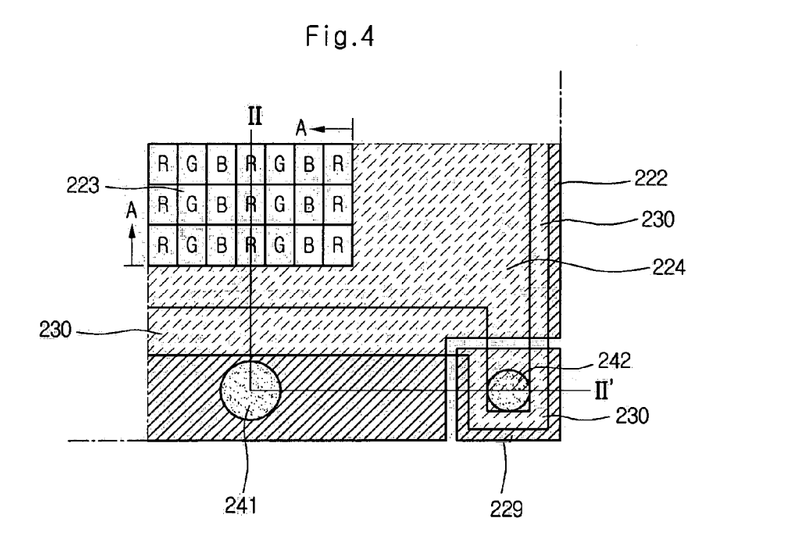
FIG. 4 is a view schematically illustrating a portion of a color filter substrate in an LCD according to an embodiment of the present invention.

FIG. 4 is a view schematically illustrating a portion of a second substrate in an LCD according to an embodiment of the present invention. Only one edge of the second substrate is shown in FIG. 4.

The LCD includes a first substrate acting as an array substrate, a second substrate acting as a color filter substrate, and a liquid crystal layer interposed between the first substrate and the second substrate. The second substrate is spaced apart from the first substrate by a predetermined distance.

Specifically, a black matrix layer formed on a predetermined portion of the second substrate is used as EMI shield. The black matrix layer is electrically connected with a conducting material such as an Ag dot, such that electromagnetic radiation in a device containing the LCD is discharged to an external ground through the black matrix layer and the Ag dot.

Referring to FIG. 4, a color filter substrate (a second substrate) includes an active region A corresponding to an image display region, which is formed on an array substrate (a first substrate). A region in which electrical signals are applied to a variety of elements is formed at a periphery of the active region.

A black matrix layer 222 is formed on the color filter substrate. The black matrix layer 222 prevents light from leaking between cells of color filter patterns and at a periphery of the active region A. A black matrix island 229 is formed at one side of the black matrix layer 222. As shown, the black matrix island 229 is partially isolated by a solid (the overcoat layer 230) and partially by the liquid crystal disposed between the substrates. In other embodiments, a solid insulator, such as the overcoat layer 230 or the color filter layer 223 can be used to completely isolate the black matrix island 229. A slit disposed between the black matrix island 229 and the black matrix layer 222 separates the two by a predetermined distance. Additionally, the slit separates the black matrix island 229 from the substrate on which the active region A is formed.

The black matrix layer 222 and the black matrix island 229 are formed of photosensitive material including a conductive material such as chrome (Cr), such that low current flows therein. This permits the black matrix layer 222 to be used as an EMI shield.

Patterns of red (R), green (G) and blue (B) color filters 223 are formed on the active region A of the black matrix layer 222. An overcoat layer 230 for insulation and planarization is coated to a predetermined thickness on the substrate 221 on which the color filter patterns are formed. The overcoat layer 230 is formed on the black matrix island 229 from conventional materials.

A common electrode 224 is formed on the overcoat layer 230 so as to operate liquid crystal cells together with a pixel electrode formed on a lower TFT substrate. The common electrode 224 is formed up to the black matrix island 229 by depositing indium tin oxide (ITO) using sputtering. The ITO is a transparent electrode material having good transmittance and conductivity characteristics as well as being chemical and thermal stable. Materials having similar characteristics as ITO may also be used, e.g. indium zinc oxide (IZO). The materials forming the transparent electrode may be fabricated using conventional techniques other than sputtering, such as plating.

An EMI Ag dot 241 electrically connected with the black matrix layer 222 is formed on a portion of an upper surface of the black matrix layer 222 that does not overlap the common electrode 224 or the overcoat layer 230. Thus, the EMI dot 241 (also called first conductor) physically contacts the black matrix layer 222. Layers physically contact each other even if a thin insulating oxide layer is present between them. Such a thin oxidation layer is common during fabrication of semiconductor devices and results, for example, from oxidation of the underlying metallic layer when the substrate is removed from the chamber used to deposit the layer on the substrate and placed in an atmosphere containing oxygen. Although usually a substantial amount of the oxide may be removed before further processing, a thin oxide usually remains as long as the metal is oxidizable and exposed to atmosphere. Similarly, electrical contact (or an electrical connection) is formed neglecting such a thin insulating layer. The EMI dot 241 eventually electrically contacts a ground contact on the transistor substrate when the substrates are assembled. The addition of the EMI dot 241 thus permits electromagnetic radiation in the device to be discharged to an external ground through the black matrix layer 222.

A common voltage (Vcom) Ag dot 242 is formed at a position that is in contact with the common electrode 224 formed on the black matrix island 229. The Vcom dot 242 eventually electrically contacts a common voltage contact on the transistor substrate when the substrates are assembled. This permits signals to be applied from a pad part of a lower substrate to the common electrode 224.

In this embodiment, the black matrix island 229 for the Vcom contact with the common electrode 224 is separated from the black matrix layer 222 used as the EMI shield by the black matrix slit. Thus, the black matrix island 229 and the black matrix layer 222 are electrically disconnected even when the same voltage is applied to the EMI and Vcom Ag dots 241 and 242.

Figure 5A:
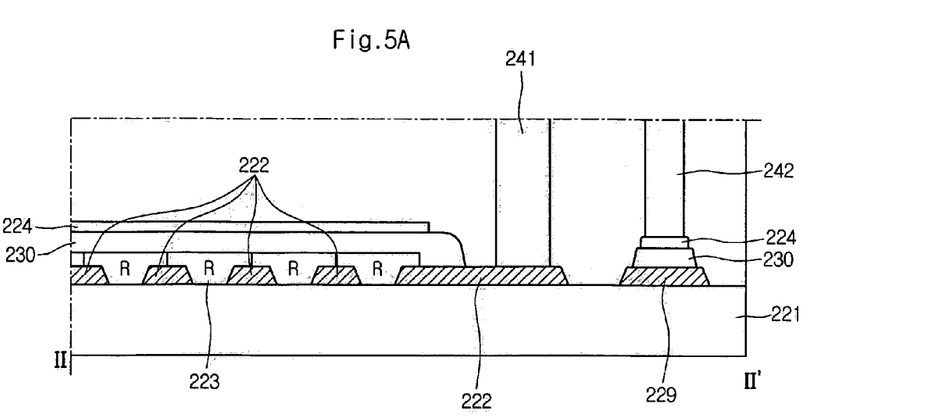
FIGS. 5A–C are partial sectional views of the color filter substrate, taken along line II–II' of FIG. 4 for different embodiments.
Figure 5B:
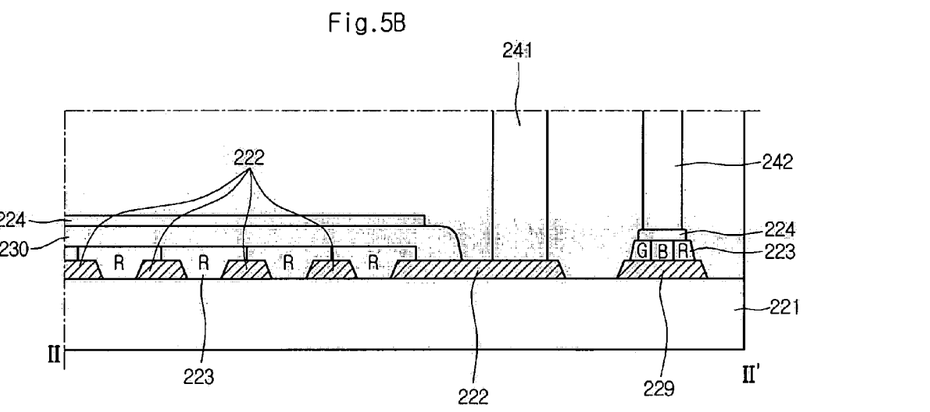
Figure 5C:
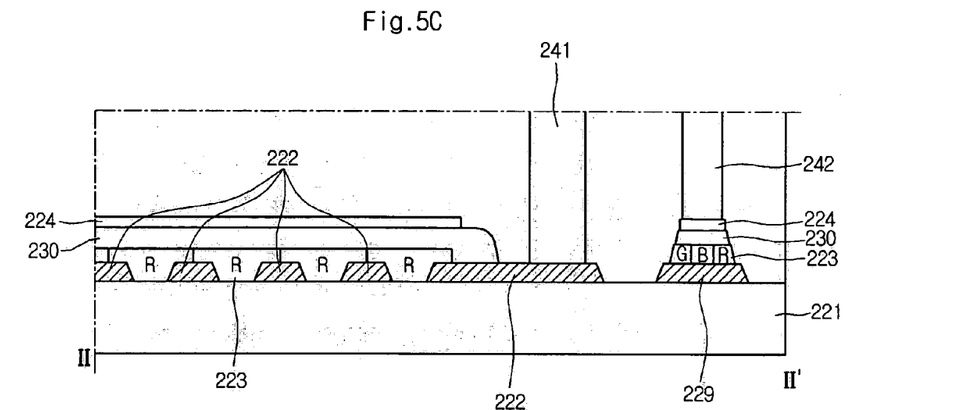

FIGS. 5A–C are partial sectional views of the color filter substrate, taken along line II–II' of FIG. 4. Referring to FIG. 5A, the color filter substrate includes the black matrix layer 222 formed on the transparent insulating substrate 221, the color filter layer 223 of red, green and blue color filters, the overcoat layer 230, and the common electrode 224, which are sequentially formed on the black matrix layer 222.

The color filter layer 223 can be formed using pigment dispersion, dyeing or printing. Pigment dispersion in particular is widely used because of its good elaborateness and reproduction.

As shown, the EMI Ag dot 241 is in direct contact with a portion of the black matrix layer 222. The Vcom Ag dot 242 is formed at a position which is in contact with the common electrode 224 formed on the black matrix island 229. This permits electromagnetic radiation in the device to be discharged to an external ground through the black matrix layer 222 and the EMI Ag dot 241, independent of the applied common voltage (Vcom). As shown in FIG. 5A–C, various insulating layers are formed between the common electrode 224 and the black matrix island 229. In FIG. 5A, only the overcoat layer 230 is formed between the common electrode 224 and the black matrix island 229, while in FIG. 5B, only the color filter layer 223 is formed between the common electrode 224 and the black matrix island 229. In FIG. 5C, however, both the color filter layer 223 and the overcoat layer 230 are formed between the common electrode 224 and the black matrix island 229. Thus, as can be seen, the insulating layers formed between the common electrode 224 and the black matrix island 229 can be the same as or different than the insulating layers formed between the common electrode 224 and the black matrix layer 222. Alternatively, an insulating layer other than either the color filter layer 223 or the overcoat layer 230 can be formed between the common electrode 224 and the black matrix island 229.

Figure 6A:
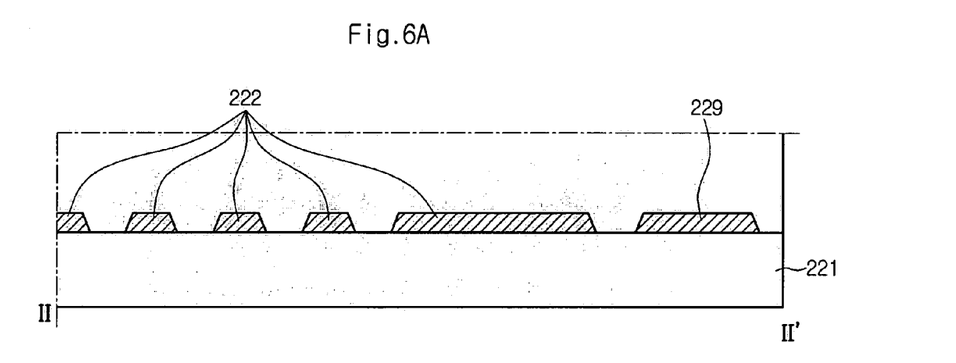
FIGS. 6A to 6E are views illustrating a method for manufacturing the color filter substrate of FIGS. 4 and 5 according to an embodiment of the present invention.

FIGS. 6A to 6E illustrate a method for manufacturing the color filter substrate of FIG. 5 according to an embodiment of the present invention. Referring to FIG. 6A, a black matrix layer 222 having an opening is formed on the transparent insulating substrate 221. The transparent insulating substrate can be, for example, glass.

The black matrix layer 222 is generally disposed among the red, green and blue color filter patterns as shown. The black matrix layer 222 is formed, for example, of a thin film metal, such as chrome, or a carbon-based organic material. A low voltage flows through the black matrix layer 222.

Since the black matrix layer 222 is used as the EMI shield, a space for the EMI Ag dot is secured so as to permit discharge of the EMI. The black matrix island 229 for the Vcom Ag dot is formed along with the black matrix layer 222.

Figure 6B:
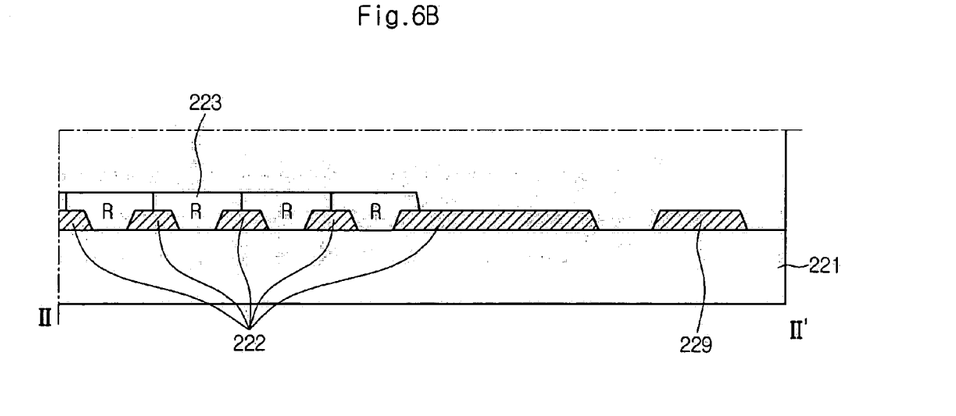

Referring to FIG. 6B, the patterns of the color filters formed using pigment dispersion are formed on both sides of the black matrix layer 220 by photolithography.

In one photolithographic process, photoresist color resin is spin-coated on the first substrate 221 having the black matrix layer 222. The color resin is then exposed and developed to thereby form the color filter patterns 223.

Figure 6C:
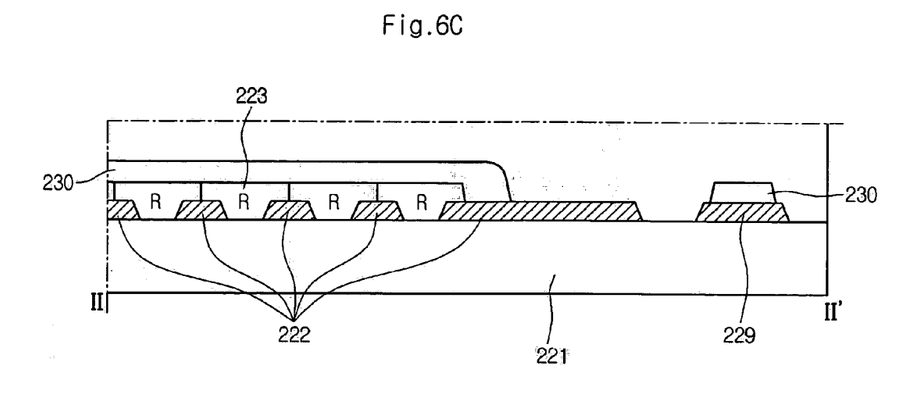

Referring to FIG. 6C, the overcoat layer 230 is coated to a predetermined thickness on the first substrate 221 on which the color filter patterns 223 are formed. The overcoat layer 230 both insulates and planarizes the underlying layers.

Figure 6D:
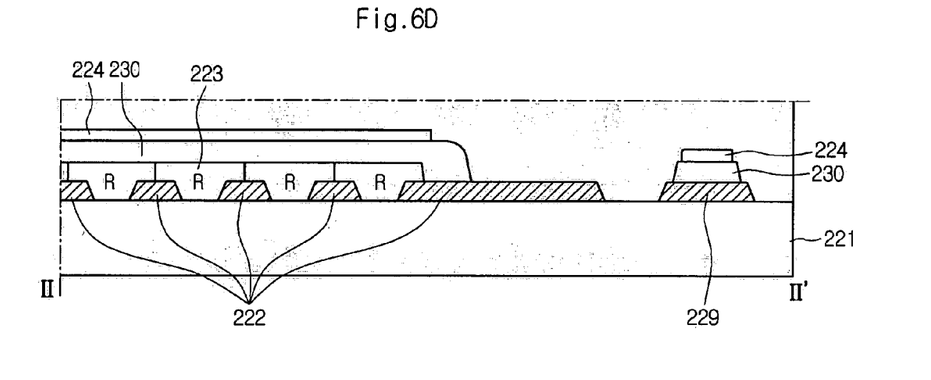

Referring to FIG. 6D, the common electrode 224 is formed on the overcoat layer 230. The common electrode 224 is formed by depositing ITO, for example, using sputtering or some other deposition technique. The ITO is a transparent electrode material having good transmittance and conductivity, as well as chemical and thermal stability.

Figure 6E:
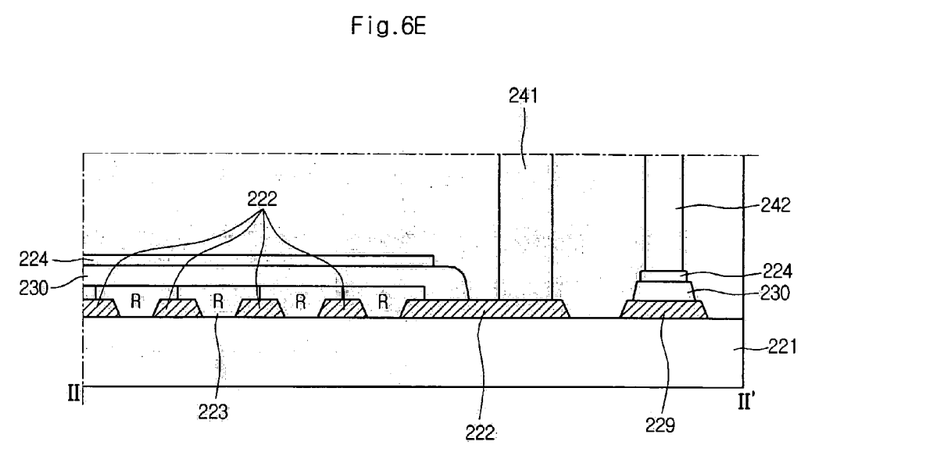

Referring to FIG. 6E, the EMI Ag dot 241 and the Vcom Ag dot are then formed. As described above, the EMI Ag dot 241 contacts the black matrix layer 222 and the Vcom Ag dot 242 is formed on the common electrode 224, which is formed on the black matrix island 229. In forming the common electrode 224, the ITO pattern can be formed below the EMI Ag dot 241. As before, the black matrix island 229 for the Vcom contact with the common electrode 224 is separated from the black matrix layer 222 used as the EMI shield, such that they are electrically disconnected even when the same voltage is applied to the EMI Ag dot 241 and the Vcom Ag dot 242.

Figure 7:
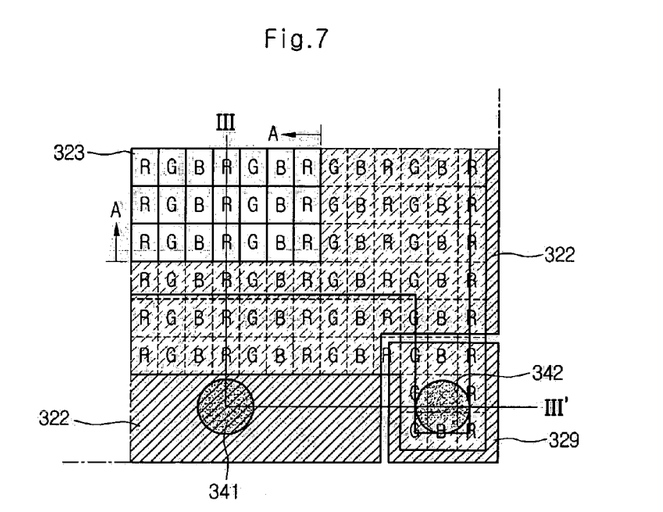
FIG. 7 is a view schematically illustrating a portion of a color filter substrate in an LCD according to another embodiment of the present invention.

FIG. 7 is a view schematically illustrating a portion of a second substrate in an LCD according to another embodiment of the present invention. One edge of the second substrate is shown in FIG. 7.

Referring to FIG. 7, a color filter substrate (a second substrate) includes an active region A corresponding to an image display region, which is formed on a first substrate (an array substrate). A region that permits electrical signals to be applied to a variety of elements is formed at a periphery of the active region.

A black matrix layer 322 is formed on the color filter substrate. The black matrix layer 322 prevents light from leaking between cells of color filter patterns 323 or from a periphery of the active region A. A black matrix island 329 is formed at one side of the black matrix layer 322. A slit between the black matrix island 329 and the black matrix layer 322 separated the two by a predetermined distance. The black matrix layer 322 and the black matrix island 329 are formed of photosensitive material including a conductive material such as chrome (Cr), such that low current flows therein. For this reason, the black matrix layer 322 can be used as the EMI shield.

Patterns of red (R), green (G) and blue (B) color filters 323 are formed on the active region A of the black matrix layer 322. In this embodiment, the color filter layer 323 of red, green and blue color filters is formed at the active region A. The color filter layer 323 also extends to the black matrix island 329, such that the color filter resin is used as an insulating layer. This permits the color filter layer 323 to replace the overcoat layer.

A common electrode 324 is formed on the color filter layer 323. The common electrode 324 formed on the color filter substrate 321 and the pixel electrode formed on a lower TFT substrate (not shown) alter the alignment of the liquid crystal cells to change the transmittance of light through the liquid crystal layer.

The common electrode 324 is formed on the black matrix island 329. The common electrode 324 is formed by sputtering ITO on the underlying layer.

An EMI Ag dot 341 electrically connected with the black matrix layer 322 is formed on a portion of an upper surface of the black matrix layer 322 that does not overlap the common electrode 324 and the color filter layer 323. This permits electromagnetic radiation in the device to be discharged to an external ground through the black matrix layer 322 and the EMI Ag dot 341.

A common voltage (Vcom) Ag dot is formed at a position that is in contact with the common electrode 324 formed on the black matrix island 329. This permits signals to be applied from a pad part of a lower substrate to the common electrode 324.

In this embodiment, the color filter resin electrically isolates the black matrix layer 322 and the common electrode 324 when forming the color filter layer 323. This permits elimination of the overcoat layer, if desired, thereby simplifying the manufacturing process.

Figure 8:
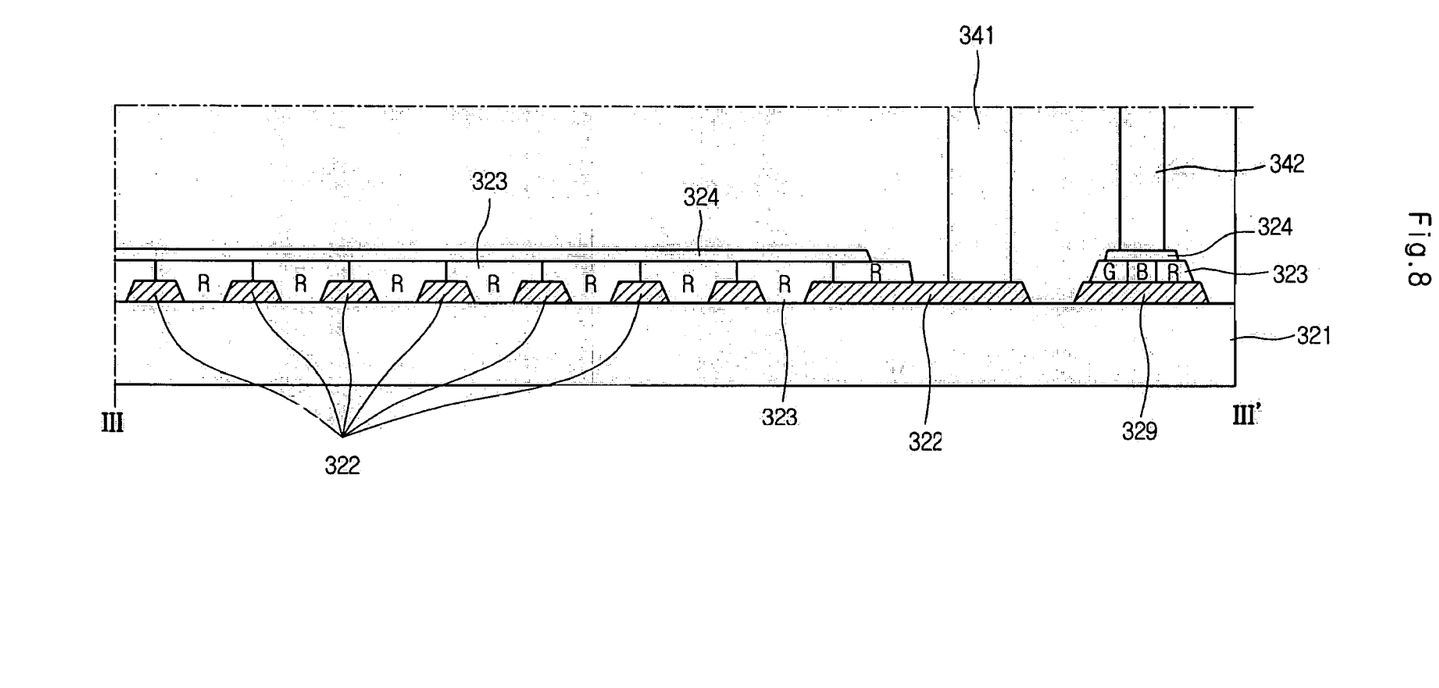
FIG. 8 is a partial sectional view of the color filter substrate, taken along line III–III' of FIG. 7.

FIG. 8 is a partial sectional view of the color filter substrate, taken along line II–II' of FIG. 7.

Referring to FIG. 8, the color filter substrate, that is, the second substrate, includes the black matrix layer 322 formed on the transparent insulating substrate 321, and the color filter layer 323 of red, green and blue color filters. The color filter layer 323 can be formed using pigment dispersion, dyeing or printing.

The EMI Ag dot 341 is in direct contact with a portion of the black matrix layer 322. The Vcom Ag dot 342 is formed at a position which is in contact with the common electrode 324 formed on the black matrix island 329.

The black matrix island 329 for the Vcom contact with the common electrode 324 is separated from the black matrix layer 322 used as the EMI shield. The black matrix island 329 and the black matrix layer 322 are electrically isolated even when the same voltage is applied to the EMI and Vcom Ag dots 341 and 342. Thus, electromagnetic radiation within the device can be discharged to an external ground through the black matrix layer 322 and the EMI Ag dot 341 independent of the applied common voltage (Vcom).

As shown in FIG. 8, the color filter layer 323 of red, green and blue color filters is formed at the active region A and also extends to the black matrix island 329. Formation of the color filter patterns electrically isolates the black matrix layer 322 and the common electrode 324.

Figure 9A:
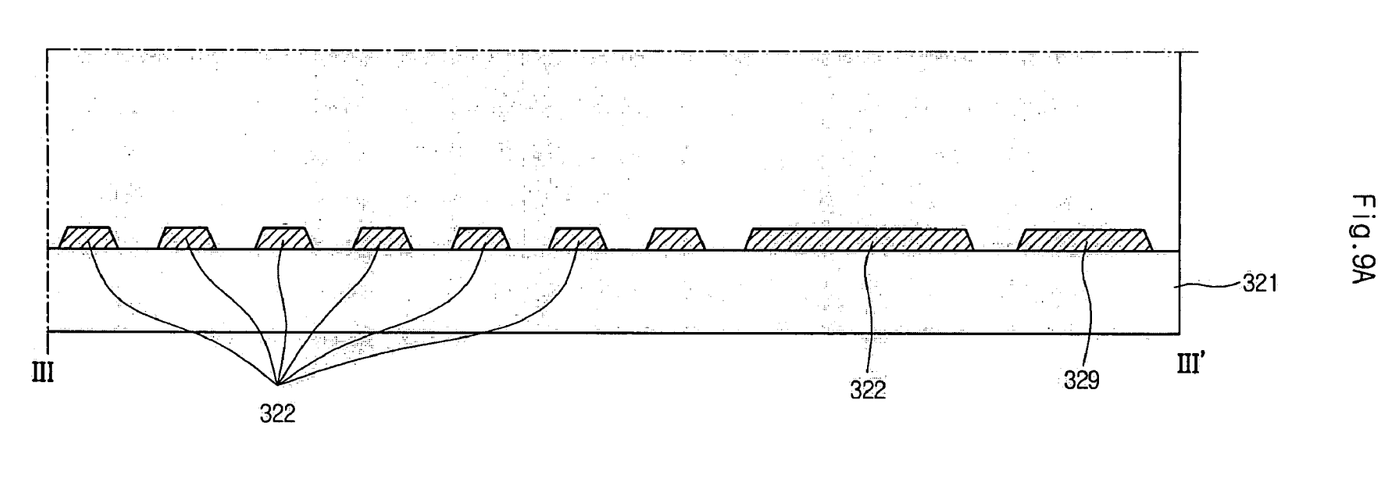
FIGS. 9A to 9D are views illustrating a method for manufacturing the color filter substrate of FIG. 8 according to another embodiment of the present invention.

FIGS. 9A to 9D illustrate a method for manufacturing the color filter substrate of FIG. 6 according to another embodiment of the present invention. Referring to FIG. 9A, a black matrix layer 322 having an opening is formed on the transparent insulating substrate 321.

The black matrix layer 322 is generally disposed among the red, green and blue color filter patterns of the color filter layer 323. The black matrix layer 322 is formed of metal thin film, such as chrome, or carbon-based organic material, and low voltage flows through the black matrix layer 322.

Since the black matrix layer 322 is used as the EMI shield, a space for the EMI Ag dot is secured so as to discharge the EMI. The black matrix island 329 for the Vcom Ag dot is formed. Signals are applied to the common electrode through the Vcom Ag dot.

Figure 9B:
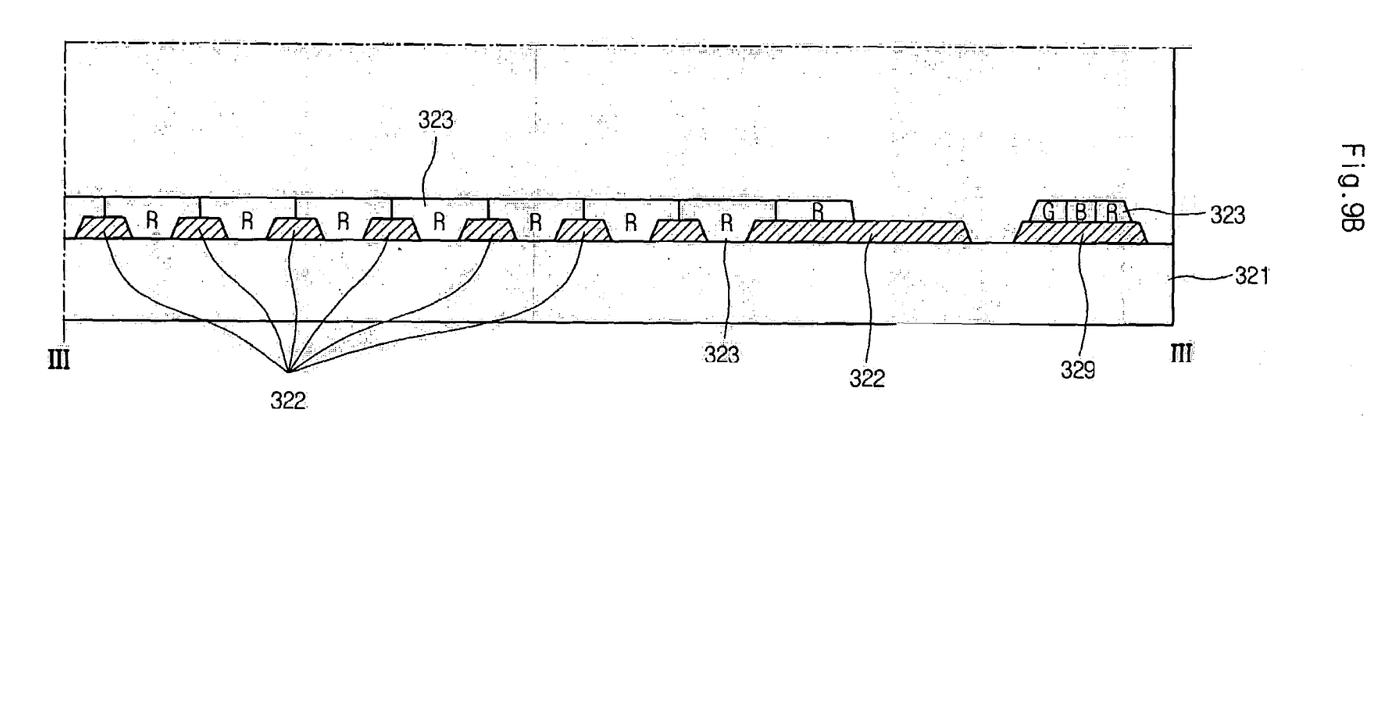

Referring to FIG. 9B, the patterns of the color filter layer 323 formed using pigment dispersion are formed on both sides of the black matrix layer 322 by photolithography. In one photolithographic process, photoresist color resin is spin-coated on the first substrate 321 having the black matrix layer 322. The color resin is then exposed and developed to thereby form the color filter patterns 323. The color filter layer 323 extends to the black matrix island 329 in addition to the active region.

This process prevents electrical interference from occurring between the black matrix layer 322 and the common electrode 324 when forming the common electrode 324. The color filter layer can be formed using the color filter resin. Since the color filter resin formed at region except for the active region A does not influence the displayed images, it can be formed without regard to the red, green and blue patterns.

That is, the color filter resin formed in regions excepting the active region A can be formed with red pattern, green pattern, blue pattern or without regard to the order of red, green and blue.

Figure 9C:
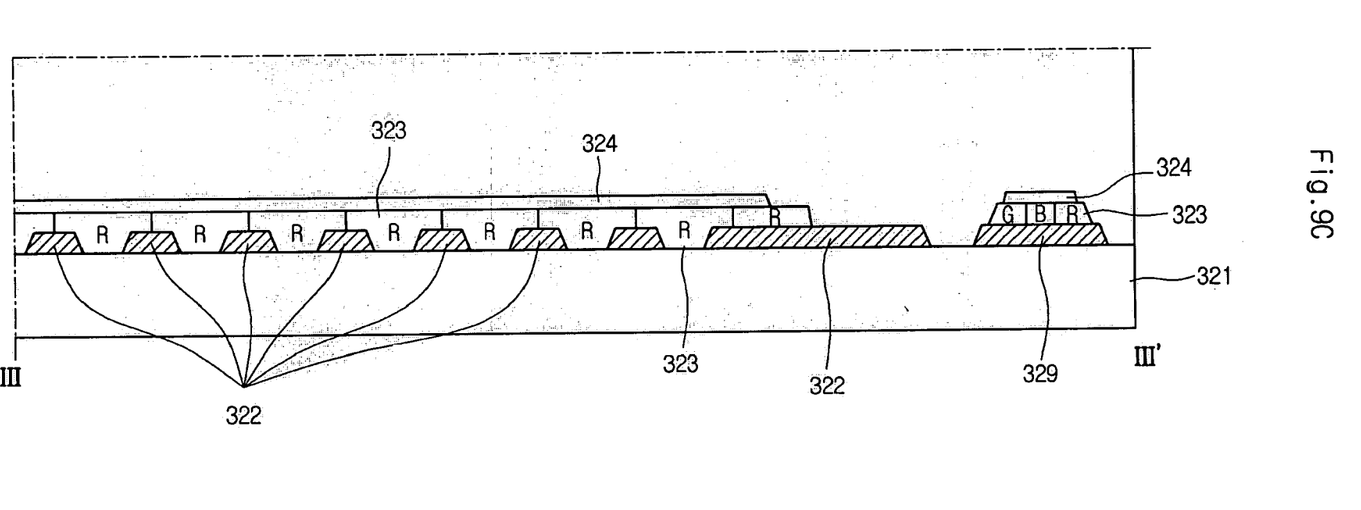

Referring to FIG. 9C, the common electrode 324 is formed on the color filter layer. This permits operation of the liquid crystal cells disposed between the substrates in conjunction with the pixel electrode formed on the lower TFT substrate.

The common electrode 324 is formed by sputtering ITO on the underlying layer.

Figure 9D:
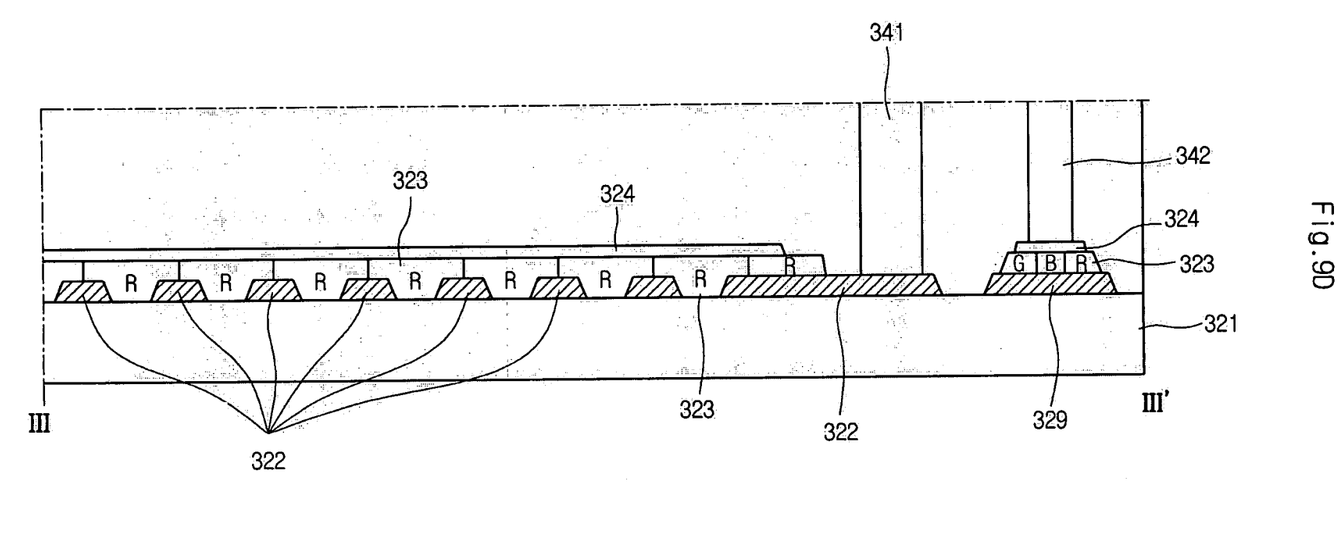

Referring to FIG. 9E, the EMI Ag dot 341 and the Vcom Ag dot 342 are formed. As described above, the EMI Ag dot 341 contacts the black matrix layer 322. The Vcom Ag dot 342 is formed on the common electrode 324, which is formed on the black matrix island 329. In forming the common electrode 324, the ITO pattern can be formed below the EMI Ag dot 341.

The color filter resin is used as the overcoat layer by extending it to the active region A of the LCD panel. Therefore, the black matrix layer 322 and the common electrode 324 can be separated from each other, thereby simplifying the manufacturing process. The EMI shield is formed using the black matrix layer, such that the device can be protected from electromagnetic radiation.

Figure 10:
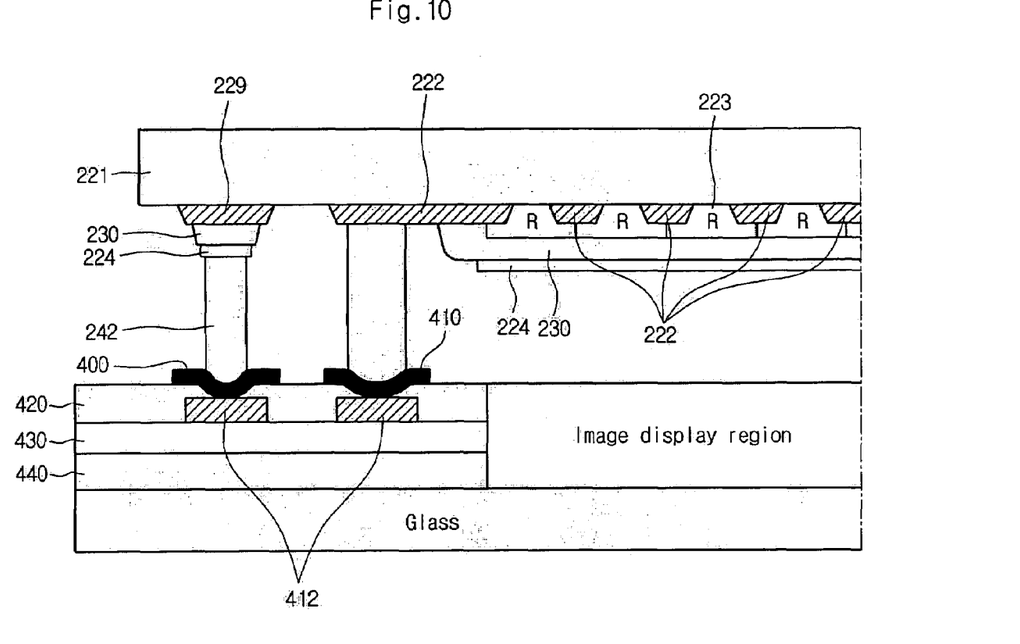
FIG. 10 is a sectional view of the image display region and the non-image display region for the embodiment shown in FIG. 5A.

FIG. 10 shows an extended sectional view of the embodiment of FIG. 5A. In this figure, a portion of the image display region (active region) and the non-display (or inactive region or peripheral region) is shown, as is the opposing substrate of the liquid crystal display. A liquid crystal layer (not shown) is disposed between the opposing substrates. In FIG. 10, the substrate opposing the color filter substrate 221 contains, for example, an active matrix display (not shown) with thin film transistors (TFT) in the display region. In the non-display region, an insulating layer such as a gate insulator 440 and an insulating interlayer 430 are formed on the opposing substrate. Source/drain metal 412 connected to the sources and drains of the TFTs are disposed on the interlayer 430 and covered with a passivation layer 420. The passivation layer 420 is planarized and holes are formed in the passivation layer 420. Contact metal is then deposited in the holes to form a common (Vcom) pad 400 and a ground pad 410, each of which are connected to one of the source/drain metal 412. The EMI Ag dot 241 is disposed on the ground pad 410 and makes electrical contact with the black matrix layer 222 when the device is assembled or the EMI Ag dot 241 is disposed on the black matrix layer 222 and makes electrical contact with the ground pad 410 when the device is assembled. Similarly, the Vcom Ag dot 242 is disposed on the Vcom pad 400 and makes electrical contact with the common electrode 224 when the device is assembled or the Vcom Ag dot 242 is disposed on the common electrode 224 and makes electrical contact with the Vcom pad 400 when the device is assembled. Alternatively, one or both of the source/drain metals can instead be a gate metal connected to the gates of the TFTs; in this case, the interlayer 430 may be omitted.

Also, instead of using an additional EMI shield, the black matrix layer is used so that the manufacturing cost is reduced. The black matrix layer and the common layer are insulated using the color filter resin, thereby simplifying the manufacturing process and enhancing the manufacturing yield. As described above, in various embodiments, an insulator (such as the overcoat layer or color filter layer) disposed between the electrode and the isolated portion of the black matrix layer can be the same as or different from an insulating layer disposed between the electrode and the black matrix layer or the color filter layer on the non-isolated portion of the black matrix layer.

It will be apparent to those skilled in the art that various modifications and variations can be made in the present invention. For example, fabrication of the embodiments above may be performed using conventional fabrication equipment and techniques. Thus, it is intended that the present invention covers the modifications and variations of this invention provided they come within the scope of the appended claims and their equivalents.

What is claimed is:

1. A liquid crystal display (LCD) comprising:
first and second substrates; and
a liquid crystal layer interposed between the first and second substrates,
wherein the second substrate comprises:
a black matrix layer formed on an active region and a periphery of the active region;
a black matrix island formed on a non-active region and spaced apart from the black matrix layer;
a color filter layer of red, green and blue color filters formed on the black matrix layer and the black matrix island;
a common electrode formed on the color filter layer; and
a first conducting material connected with the black matrix layer and a second conducting material connected with the common electrode on the black matrix island.

2. The LCD according to claim 1, wherein the conducting material comprises silver.

3. The LCD according to claim 1, wherein the color filter layer formed on the non-active region comprises at least one color of red (R), green (G), and blue (B).

4. The LCD according to claim 1, wherein the color filter layer formed on the non-active region comprises red (R), green (G), and blue (B) color filters formed sequentially.

5. The LCD according to claim 1, wherein the black matrix layer comprises a conductive black resin.

6. The LCD according to claim 1, further comprising a common electrode material formed between the first conducting material and the black material layer.

7. The LCD according to claim 1, wherein the second conducting material is electrically in contact with the common electrode formed on the black matrix island.

8. The LCD according to claim 1, wherein the color filter layer terminates before extending to a position on an upper surface of the black matrix layer contacted by the first conducting material.

9. A method for fabricating a liquid crystal display (LCD), the method comprising:
forming a black matrix layer and a black matrix island separated from the black matrix layer on a substrate;

forming a color filter layer on the black matrix layer and the black matrix island;

forming a common electrode on the color filter layer; and forming a first conducting material connected with the black matrix layer and a second conducting material connected with the common electrode on the black matrix island.

10. The method according to claim 9, wherein the conducting material comprises silver.

11. The method according to claim 9, wherein the color filter layer formed on the non-active region is formed of at least one color of red (R), green (G), and blue (B).

12. The method according to claim 9, wherein the color filter layer formed on the non-active region comprises red (R), green (G), and blue (B) color filters formed sequentially.

13. The method according to claim 9, wherein the second conducting material is electrically in contact with the common electrode formed on the black matrix island.

14. The method according to claim 9, wherein the color filter layer terminates before extending to a position of the black matrix layer contacted by the first conducting material.

* * * * *